Nov. 18, 1952    J. E. LINDBERG, JR., ET AL    2,618,248
LIQUID LEVEL INDICATOR
Filed Feb. 5, 1948    2 SHEETS—SHEET 1
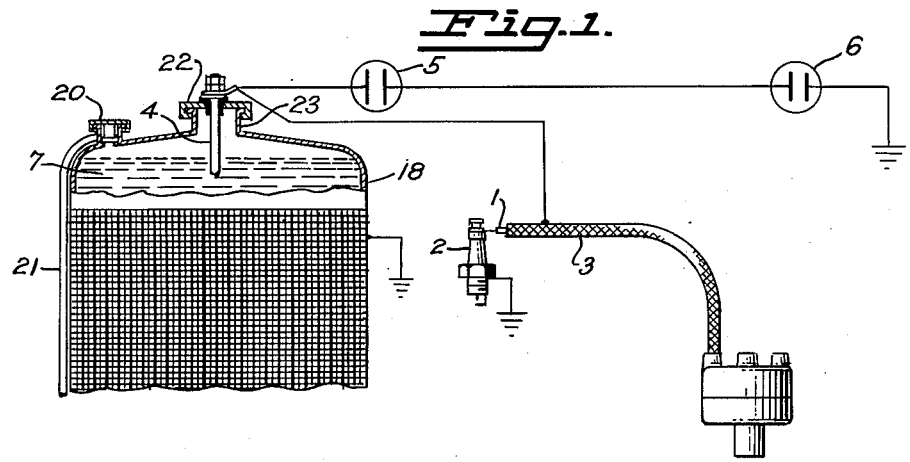
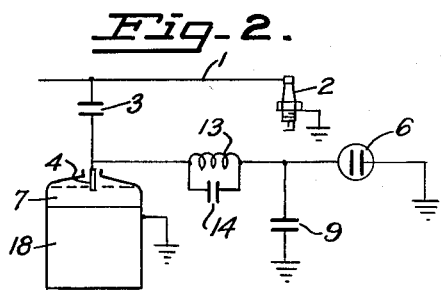
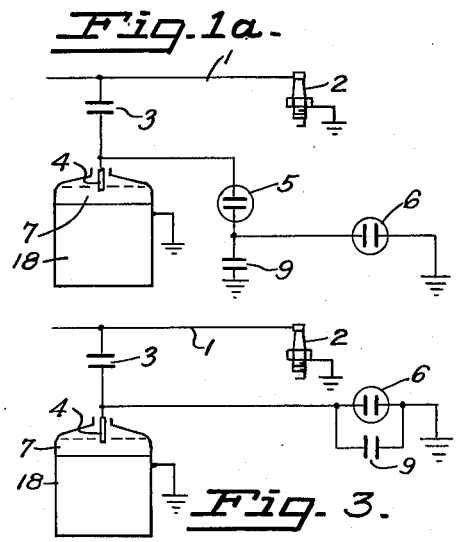
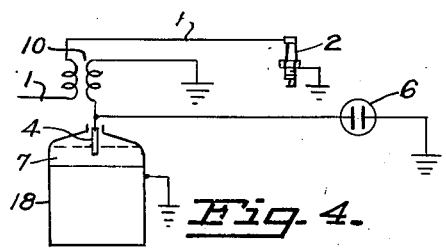
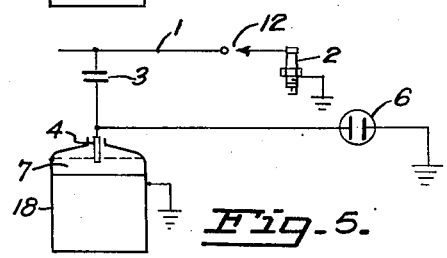
INVENTOR.
John E. Lindberg Jr, Brooks Walker
BY Charles H. Ray
Brooks Walker Nov. 18, 1952  J. E. LINDBERG, JR., ET AL  2,618,248
LIQUID LEVEL INDICATOR
Filed Feb. 5, 1948  2 SHEETS—SHEET 2
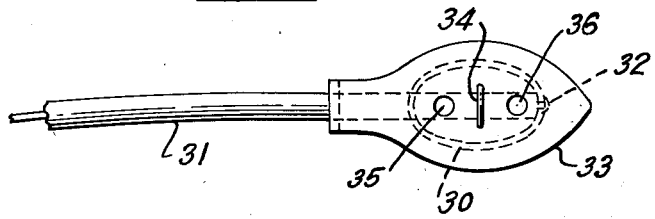
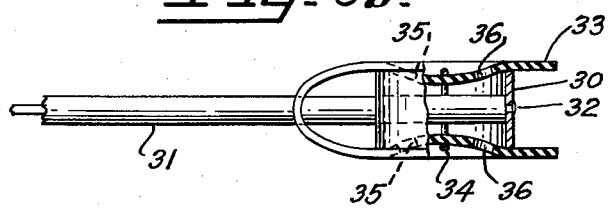
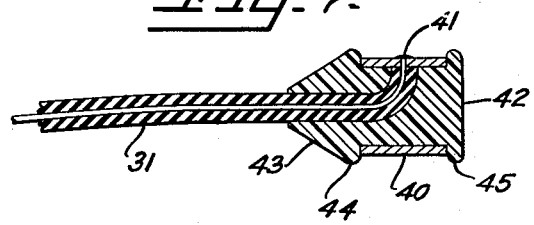
INVENTOR.
John E. Lindberg Jr.
Charles H. Kay
BY
Brooks Walker Patented Nov. 18, 1952

2,618,248

UNITED STATES PATENT OFFICE 2,618,248

LIQUID LEVEL INDICATOR

John E. Lindberg, Jr., Redwood City, Charles H. Ray, Millbrae, and Brooks Walker, Piedmont, Calif., assignors, by mesne assignments, of fifty-one per cent to John E. Lindberg, Jr., Lafayette, forty per cent to Brooks Walker, Piedmont, and nine per cent to Ernie L. Lindberg, Emeryville, Calif.

Application February 5, 1948, Serial No. 6,458

6 Claims. (Cl. 123—41.15)

This invention pertains to a liquid level indicator particularly adaptable to use in warning the operator when the coolant level is low in the radiator of automotive vehicles.

A further object is to provide an indicator which uses the operating energy from a pick up adjacent to the spark plug lead, to utilize energy that is generally wasted and which cannot run down the battery of the car, does not have to be turned on and off, is simple and positive in operation, and inexpensive to manufacture.

Other objects are to improve the ignition circuit and efficiency of the ignition circuit and still provide an energy source suitable for operating a warning device with an exceedingly simple and positive trouble free circuit.

Other objects of the invention are to provide improved circuits for controlling a warning device where such device obtains its energy from spark plug electric energy with minimum interference with spark plug ignition functions.

Further objects of this invention will be pointed out in the accompanying description and claims.

We have illustrated our invention by way of example in the accompanying drawings, in which:

Figure 1 is a view of the invention, partly in section and partly schematic, illustrating one form of the invention.

Figure 2 is a schematic diagram illustrating another form of the invention using an inductance in place of one of the gas filled regulator tubes.

Figure 3 is a schematic diagram illustrating another form of the invention utilizing a capacitor across the gas filled indicator in place of the second gas filled regulator tube shown in Figure 1.

Figure 4 is a schematic diagram illustrating another form of the invention utilizing a transformer type of energy pickup from the spark plug lead in place of the capacitor type shown in Figure 1.

Figure 5 is a schematic diagram illustrating another form of the invention and illustrating a modification of the invention shown in Figure 1 in that a series spark gap is shown in the spark plug circuit ahead of the spark plug ignition causing gap.

Figures 6 and 7 illustrate contacting probe types useable in this invention.

In all figures, like numerals of reference refer to corresponding parts in the various figures.

In Figure 1, radio frequency energy is taken by means of capacitance 3 from the spark plug wire 1 feeding spark plug 2. This capacitance may consist of a length of metallic braid slipped over the insulation on the spark plug wire 1. This high frequency energy is fed to metallic probe 4, then through neon lights 5 and 6. Probe 4 serves to contact liquid 7 and thereby ground out the energy from capacitance 3, thus preventing neon lights 5 and 6 from receiving appreciable energy. When contact between probe 4 and liquid 7 is broken, full voltage from capacitor 3 is applied to neon bulbs 5 and 6 which flash to give the desired warning for low water level.

Light 5 is ordinarily installed near the probe 4 end of the wire connecting probe 4 and light 6. Light 5 serves to keep stray voltage pickup from flashing light 6 by acting in conjunction with the capacitance of the wire from light 5 to light 6 to form a voltage dividing network to reduce the value of the voltage arriving at light 6, when probe 4 is contacting liquid 7, to a point at which light 6 will give no indication.

Figure 1A further illustrates this principle. Herein the lead to ground capacitance of the conductor connecting light 5 and light 6 is shown as capacitor 9. This capacitor 9 is especially effective because of the high frequencies being used. It would have negligible effect if low frequency energy were being used. Capacitor 9, because of its distributed nature, does not effectively remove the very high radio frequencies, but these are usually small in value and do not destroy the utility of the system.

Neon bulb 5 is optional, and is normally necessary in installations wherein greatly fluctuating values of pickup voltage are obtained which render it difficult to keep light 6 completely blacked out during normal operation with ample coolant liquid. Light 6 is preferably located in the driver's compartment at a point highly visible to the operator.

Where it is desired that the radiator cooling system be provided with a pressure operated relief cap to secure higher boiling temperatures under pressures controlled by the cap as well as better retention of antifreezes, a pressure cap 20 of such design commonly known in the industry may be employed and used as the filler cap. Overflow tube 21 is connected above or beyond the pressure seal to bypass steam or water generated at more than the cap controlled pressures. Where pressure caps are not necessary, cap 22 may be the usual filler cap, or may be an auxiliary cap attached to auxiliary neck 23 to minimize the complications of attaching probe 4 through pressure cap 20 where pressure caps are required.

Liquids of poorer conductivity than that of water, such as alcohol, glycerin, prestone, etc., will allow satisfactory operation of the system because the probe 4 to ground resistance is still low when compared to the impedance of capacitor 3.

Figure 2 is similar to Figure 1A with the exception that choke or inductance 13 is substituted for neon lamp or gas filled discharge tube 5. Capacitor 14 represents the distributed capacity between the windings of said coil 13. For the greatest effectiveness, coil 13 should be located as close as practicable to probe 4. In similar fashion to that noted for Figure 1A, coil 13 and capacitor 9 act as a voltage dividing network to reduce the voltage which remains across said gas filled discharge tube 6 when probe 4 is covered due to the appreciable resistance of the liquid between probe 4 and the container 18. The coil 13-capacitor 9 filter combination is most efficient at the lower and medium high radio frequencies, these frequencies being the chief causes of indicator 6 being slightly illuminated in the absence of said combination when probe 4 is covered with liquid. The high and very high radio frequencies, although normally of much less voltage than the lower radio frequencies, are sufficient to afford brilliant illumination of light 6 when probe 4 is uncovered by liquid 7.

Figure 3 is the same as Figure 1, but with the incorporation of capacitor 9 which acts as a load to reduce the value of all voltages which may arrive at indicator 6 to a point at which they will not flash indicator 6 when probe 4 is in contact with the liquid 7. This capacitor 9 reduces the brilliance of light or indicator 6 very little when contact with probe 4 and liquid 7 is broken.

Figure 4 illustrates a second method of deriving energy from a spark plug lead. Herein a portion of the energy in the spark current passing through the primary of transformer 10 is transferred to the secondary winding by means of electro magnetic coupling. The methods of producing a warning light shown in Figures 1, 2, 3, and 5 are also useable with this method of energy derivation. An advantage of this method is that the transformer may be tuned to select only desired frequencies and reject those that are undesirable. This would be useful where the lead feeding indicator 6 might cause interference with radio receiving equipment installed nearby. For purposes of this invention transformer 10 is designed to select only the higher radio frequencies.

Figure 5 illustrates a simple method of promoting adequate high frequency oscillations that is useful in spark ignition engines that do not produce regular ignition energy oscillations because of a cold fuel-air mixture, lean mixture, or other reasons. This method merely consists of a small gap 12 located in series with the spark plug lead near the spark plug.

In all of the above-described methods for securing energy from an ignition lead, special care is taken in the selection of components to favor the selection of the higher frequency elements of the spark current to afford a relatively low impedance source for these high frequencies, and to discriminate against the lower frequencies. This is very desirable for the following reasons:

1. It is undesirable to bleed off any appreciable amount of the low frequency energy available in the spark current as this energy is primarily responsible for initiating the spark across the plug gap and is sometimes somewhat marginal on the low side, particularly when starting a cold engine with a partially charged battery.

2. The lower spark frequencies do not give a sharp indication when used with a neon bulb type indicator, there being a certain amount of residual glow which is very difficult to remove entirely. The results obtained by using the higher frequencies are much more satisfactory in that the neon bulb indication is either lighted brightly or is completely out, the transitional period being extremely sharp. The components selected for the spark energy pickup are designed to aid in the generation of high frequency oscillations.

3. By the use of the high frequency oscillations it is possible to use less energy for the same light brilliance and thereby very considerably lessen the danger of the use of high voltage circuits in areas that may become hazardous due to fuel leakage or other reasons. The principal reason for the improved performance made possible by utilizing only the higher radio frequencies is that as the ordinary neon lamp is essentially a low impedance device when conducting current, and the energy source is of low impedance, to none but the very high radio frequencies, an adequate impedance match is thus only possible for the higher frequencies.

Typical values of some of the components illustrated in the several figures are as follows:

| Figure | Item | Value or Description |
|---|---|---|
| 1 | 3 | Capacitance to wire is about 40 $\mu\mu f$. |
| 1 | 5, 6 | Type NE-51 bulbs are satisfactory (manufactured by General Electric Co.). |
| 2 | 13 | 2.5 millihenry. |
| 2 | 14 | 6 $\mu\mu f$. |
| 1a | 9 | 50 to 125 $\mu\mu f$. |
| 3 | 9 | 200 $\mu\mu f$. |
| 5 | 12 | 1/16 inch. |

In addition some clarity might be added to the above description by a designation of the ranges of frequencies implied by the following terms:

| Term | Frequency Range |
|---|---|
| Low frequency | Approximately 2,000 C. P. S. to 30,000 C. P. S. |
| Medium frequency | 30,000 C. P. S. to 1 megacycle. |
| High frequency | 1 megacycle to 25 megacycles. |
| Very high frequency | 25 megacycles and greater. |

Figures 6a, 6b, and 7 illustrate types of liquid contacting probes especially designed for use in radiators now commonly encountered in the majority of automotive vehicles. As the details of construction of different types and makes of radiators vary widely, it is necessary, in order that the probe have greater utility, that the probe have at least the following specifications:

1. Adjustable in length
2. Adjustable laterally
3. Well insulated from undesired metallic contact.
4. Good conducting surface with sufficient area for adequate liquid contact.
5. Easy to clean
6. Easy to remove from radiator.

In Figures 6a and 6b, 30 is a section of cadmium plated brass or steel tubing, elliptical or circular in cross section, to which is secured wire 31. Wire 31 is a flexible wire having a high degree of insulation. Wire 31 solders to tube 30 at, preferably, point 32. 33 is primarily an insulator but also serves as a guide to prevent the probe from being caught on some interior projection in the radiator which might restrict or prevent the easy removal from the radiator of the probe. Normally 33 would be made from sheet rubber or neoprene, the flexibility of these materials adding somewhat to the probe's removability; however in many instances, other insulating materials would be equally suitable. 34 may be a loop of wire or a staple inserted through holes in 33 and pulled tight thus cupping in 33 somewhat, thereby centering 33 on tube 30 and securing 33 to 30. 35 and 36 are merely holes to allow the ready entry of coolant into the probe, thus removing a possibility of the probe floating on the coolant liquid. In Figure 7, 40 is a conducting ring which may be of brass or similar material resistant to corrosion. Wire 31 is well insulated and is soldered to ring 40 at point 41. 42 is a block of insulating material such as wood, plastic, or rubber. 43 is a cone shaped surface of 42 which promotes easy probe removal. 44 and 45 are ridges of insulation which serve to insulate metallic surface 40.

While we have shown this applied to a radiator coolant level warning device, it is to be understood that this same device can be used as a liquid level warning device for such levels as battery fluid level, air bell fluid level (in an engine-driven pump system) or any other type of liquid level indicator. The same indicator could be connected by a switch to various probes in different liquid locations for operator selection and warning for various liquid levels.

We do not wish in any way to limit ourselves to the exact details or mode of operation set forth in this specification and drawings, for it will be obvious that wide departure may be made in the way of details without departing from the spirit and scope of our invention which is set forth in the following claims.

What is claimed is:

1. A liquid-level indicator, including in combination an internal combustion engine having a grounded ignition system; a grounded liquid container; an electrode in said container at a preselected level; an electrical connection between said electrode and the high potential side of said ignition system, said connection including a reactance adapted to pass only the high-frequency components of said ignition system to said electrode; and an electrical indicating means connected between said electrode and ground.

2. The indicator of claim 1 in which said reactance comprises a condenser having a capacitance of the order of approximately 40 $\mu\mu f.$, so as to permit the passage of only the high frequency components of said ignition energy.

3. The indicator of claim 1 in which the reactance comprises an inductive coupling adapted to prevent passage of low frequency currents.

4. The indicator of claim 1 in which there is a grounded condenser between said electrode and said indicating means.

5. The indicator of claim 1 in which there is a said second reactance between said electrode and said indicating means, comprising a condenser and a coil in parallel with each other and in series with said indicating means, said condenser and coil being adapted to trap out medium frequencies and pass high frequencies.

6. A liquid-level indicator for a motor driven device, including in combination an internal combustion engine having a grounded spark-plug ignition system; a liquid container grounded to said ignition system; an electrode in said container at a preselected level; a condenser connected between the high potential side of at least one said spark plug and said electrode, so that only the high frequency components of said ignition current pass to said electrode; and an electrical indicator connected between said electrode and said container, and a grounded condenser between said electrode and said indicator.

JOHN E. LINDBERG, Jr.
CHARLES H. RAY.
BROOKS WALKER.

REFERENCES CITED

The following references are of record in the file of this patent:

UNITED STATES PATENTS

| Number | Name | Date |
|---|---|---|
| 1,389,270 | Nickum | Nov. 29, 1921 |
| 2,159,531 | Polin | May 23, 1939 |
| 2,202,197 | Ewertz | May 28, 1940 |
| 2,424,657 | Goodman | July 29, 1947 |